(No Model.) 3 Sheets—Sheet 1.
P. BUTLER.
MACHINE FOR TRIMMING CARTRIDGE SHELLS.

No. 378,953. Patented Mar. 6, 1888.

Witnesses.
Wm. S. Brown
N. P. Ockington

Inventor
Paul Butler.
By Davis & Hatchee
Atty.

(No Model.)　　　　　　　　　　　　　　　　　3 Sheets—Sheet 3.
P. BUTLER.
MACHINE FOR TRIMMING CARTRIDGE SHELLS.

No. 378,953.　　　　　　　　　　Patented Mar. 6, 1888.

Witnesses.　　　　　　　　　　　　Inventor.

UNITED STATES PATENT OFFICE.

PAUL BUTLER, OF LOWELL, MASSACHUSETTS.

MACHINE FOR TRIMMING CARTRIDGE-SHELLS.

SPECIFICATION forming part of Letters Patent No. 378,953, dated March 6, 1888.

Application filed October 18, 1883. Serial No. 109,327. (No model.)

*To all whom it may concern:*

Be it known that I, PAUL BUTLER, of Lowell, in the county of Middlesex and State of Massachusetts, have invented a new and useful Improvement in Machines for Trimming the ends of Cartridge-Shells, of which the following is a specification.

My invention relates to what are commonly known as "trimming-machines" for trimming off the ends of metallic cartridge-shells preparatory to charging them with powder and ball; and it consists in so arranging and adjusting to each other the several parts of such a machine that the metallic shells shall be automatically fed thereto, trimmed perfectly even on the ends, and automatically discharged therefrom, substantially as hereinafter described, thereby greatly facilitating the process of trimming the metallic cartridge-shells and insuring greater accuracy in the work.

Figure 1:
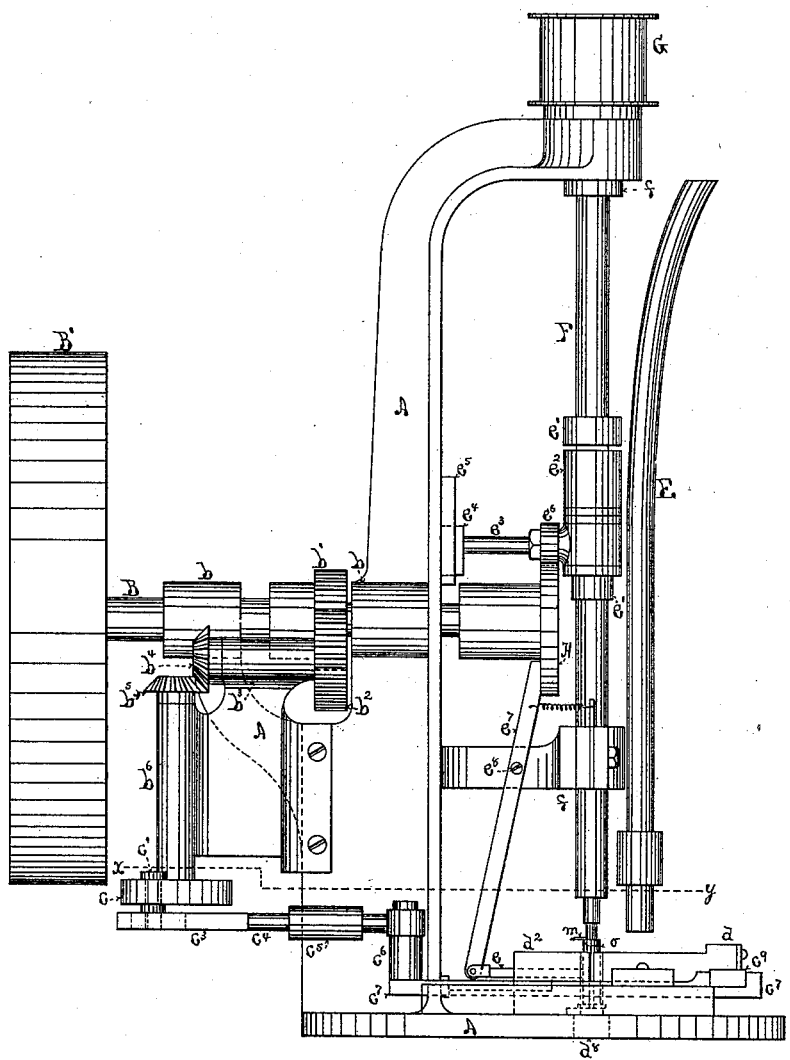
Figure 2:
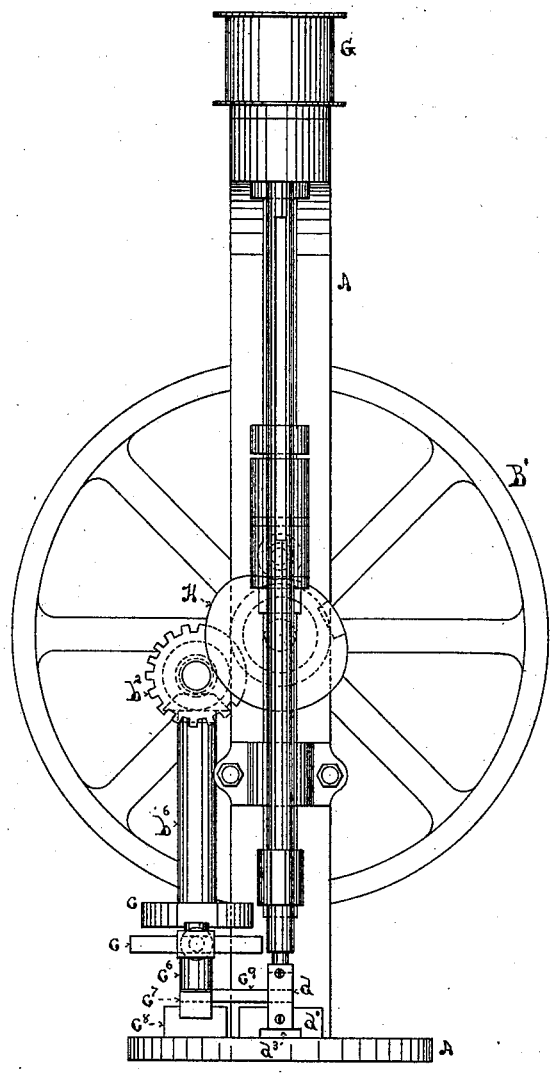
Figure 3:
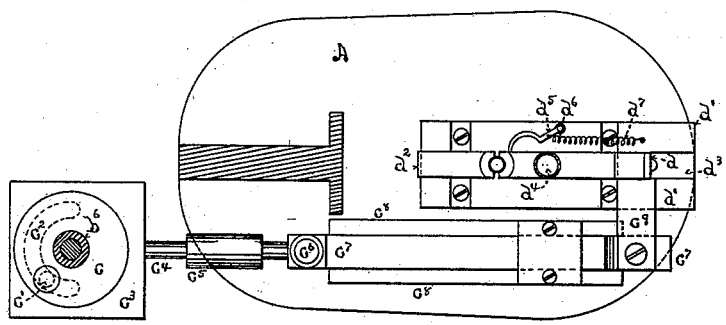

In the drawings, Figure 1 is a side elevation of a cartridge-shell-trimming machine constructed according to my invention. Fig. 2 is an end elevation of the same. Fig. 3 is a top plan view of the platform of the machine, showing in detail the mechanism for presenting and holding the shell to the trimmer, the feeding and trimming mechanisms being removed, the parts shown being below the dotted line $x y$ of Fig. 1.

A is the frame-work and bed-plate of the machine, to which the working parts are attached, made of iron or any other suitable material.

B is a shaft supported in said frame-work by suitable boxes or bearings, $b\ b$, to which motion is given by the belt-wheel B' from a counter-shaft.

To the shaft B is attached a gear-wheel, $b'$, which gears into another wheel, $b^2$, attached to a shaft, $b^3$, which carries on its other end bevel-wheel $b^4$, which in turn gears into the bevel-wheel $b^5$ on the upper end of the vertical shaft $b^6$, these shafts being supported in sleeves or boxes connected to the frame-work A.

On the lower end of the shaft $b^6$ is a plate or disk, $c$, having a round pin, $c'$, fastened in it vertically near the circumference and projecting downward into a curved slot, $c^2$, which it fits into, in the plate $c^3$, all being shown more fully in detail in Fig. 3. The plate $c^3$ is attached to the rod $c^4$, which plays freely longitudinally through the stationary sleeve $c^5$, attached to the frame-work. This rod $c^4$ is attached at its other end to the post $c^6$, which in turn is attached to the sliding strip of metal $c^7$, working longitudinally in guideways $c^8$, attached to the table or platform of the machine.

At the opposite end of the slide $c^7$ from the rod $c^4$ a cross-bar, $c^9$, connects the reciprocating bar $c^7$ with another sliding bar, $d$, which reciprocates parallel to it in the guideways $d'$ $d'$. The bar $d$ is of considerable vertical thickness, and at the opposite end from the connection with $c^9$ is hollowed or cupped out to receive a cartridge-shell vertically and partially surround it, and has a groove to receive the head of the shell at the bottom end of this cupped out part which embraces the body of the shell, as shown more particularly in dotted lines in Fig. 1. Opposed to this end of the slide $d$ in the guideways $d'$ is the fixed piece of metal $d^2$, of similar height and similarly cupped out to embrace the opposite side of the shell from that held by $d$ in its end adjacent to the latter, and also having a similar groove to receive the head of the shell directly opposite to that in the sliding bar $d$. The guideways $d'$ are placed far enough apart to allow the head of the shell to pass freely down between them, and the cupped or hollowed out part of the adjacent ends of the sliding bar $d$ and of the fixed bar $d^2$ do not quite embrace on each side a semi-circumference of the cartridge-shell, and thus enable it to be grasped firmly between these two pieces of metal, the movement of the bar $c^7$ being graduated to exactly produce this result.

Beneath the bar $d$ is a platform, $d^3$, placed at just the right height to cause the rim of the cartridge-shell, when it is dropped onto this platform-head downward, to enter the groove in the bar $d$ made for this rim, when the bar is pushed forward against the shell resting on the platform. The circle $d^4$, Fig. 3, represents the place where the cartridge-shells are dropped head downward between the guideways $d'\ d'$, and the bar $d$ is given sufficient reciprocating motion to cause it to slide away from the fixed bar $d^2$ far enough to carry its cupped-out end beyond this point, this point being directly under the tube E, down which the cartridge-shells are fed to the machine. It is evident, therefore, that when the bar $d$ is moved backward to the end of its path and a cartridge-shell dropped at the point $d^4$ head downward upon the platform $d^3$, and the bar $d$ is brought toward the bar $d^2$ to the other end of its path, the cartridge-shell $o$ will be pushed forward and held in the position shown in Fig. 1. To assist in this process a curved arm, $d^5$, is pivoted at $d^6$ and held against the reciprocating bar $d$ by the spiral spring $d^7$. When the bar $d$ is back in position to receive the shell dropped downward, as described, the curved hook $d^5$ surrounds the shell on the opposite side without being near enough to prevent its freely dropping between the hook and the cupped or hollowed end of the bar $d$; but as bar $d$ begins to move toward $d^2$ the end of this curved hook as it is pushed forward bears against the cartridge-shell, and by the resiliency of spring $d^7$ presses it firmly in place in the cupped-out end of bar $d$ and continues to hold it there until it has approached so near the cupped-out end of bar $d^2$ as to insure its being grasped firmly in place between the two bars, as shown in Fig. 1. The platform $d^3$ extends as far as the hole through the bed-plate $d^8$, (shown in dotted lines in Fig. 1,) which hole is of sufficient size to allow the cartridge-shell to drop freely through it when released from the grip of $d$ $d^2$, and when so released it is pushed out of $d^2$ and caused to drop through by the rod $e$ working through a hole in $d^2$ horizontally and actuated as hereinafter described.

The trimming mechanism consists of a vertical shaft, F, which revolves freely in bearings $f f$, attached to the frame A, and slips up and down through a driving-pulley, G, placed on its upper end, and fitted with groove and spline on the shaft F to compel the latter to revolve with it while working up and down, the weight of pulley G preventing its rising from the upper bearing, $f$, on which it rests. This pulley is also driven from a counter-shaft.

$e'$ $e'$ are two collars firmly fixed to the shaft F, between which a sleeve, $e^2$, is placed, in which the shaft F freely revolves. Firmly fixed into one side of the sleeve $e^2$ is the rod $e^3$, which extends to a sliding piece of metal, $e^4$, into which it is fixed, which moves up and down in guideways $e^5$, attached to the frame of the machine, and between which the sliding piece $e^4$ is secured and allowed to slide freely in the usual manner.

On the rod $e^3$, next the sleeve $e^2$, is placed a small smooth-faced revolving wheel, $e^6$, secured in place by a nut, as shown in Fig. 1, which wheel turns freely on the rod $e^3$. This wheel bears on its surface against the cam H, which is attached to the end of the shaft B, the wheel being placed directly over the axis of the cam, and the axis of both the wheel and the cam being in line with the vertical shaft F. This wheel $e^6$ may be omitted, if desired, and the cam H made to bear directly on rod $e^3$. It will now be perceived that as the shaft B is revolved, carrying with it the cam H, a vertical reciprocating motion will be given to the shaft F, while at the same time it is allowed to revolve freely as driven by the pulley G. The lower end of the shaft F is turned down, so as to just fit the inside of the cartridge-shell to be trimmed, into which it descends accurately as the latter is held by the pieces $d$ $d^2$, and in the side of this end of the shaft is fixed a small knife or cutter, $m$, projecting horizontally and at such a height that when the shaft F has descended to its lowest point it will trim the shell to exactly the right length, while the latter is held in the grasp of the holders $d$ $d^2$.

On the rear face of the cam H is a projection, placed at the proper point, which comes in contact with the lever $e^7$, which is pivoted at $e^8$ and attached at its opposite end to the rod $e$. This projection is so placed upon the cam that it comes in contact with lever $e^7$ when the holder $d$ has receded from $d^2$ about half its horizontal path, and when this projection strikes $e^7$ it presses upon the rod or plunger $e$ and throws the shell away from holder $d^2$ sufficiently to cause it to drop through the hole $d^3$ in the bed-plate of the machine.

The different parts of this mechanism are so arranged that the reciprocating shell-holder $d$ carries the shell up against $d^2$, when the peculiar curve of slot $c^2$ causes the holders to remain stationary until shaft F descends and trims the shell, when, shaft F rising and holder $d$ receding, rod $e$ ejects the shell, which drops through hole $d^8$, when holder $d$ brings forward another shell, and the operation is repeated. I thus attain great rapidity of operation and great accuracy in trimming the shells. As one shell drops down out of tube E, the next follows and rests upon the top of reciprocating holder $d$, unable to leave the tube until the holder has withdrawn to receive it.

It is well known that the subsequent operations of charging the shell depend for their accuracy and perfection upon the accuracy with which the shells are trimmed to a given length, and with all the devices heretofore used for trimming it has not been possible to accomplish this as perfectly as desired, nor with great rapidity, and greater rapidity has always been attained at the expense of accuracy, owing to certain parts of the work being performed by manual labor.

I desire to call attention to the fact that in my present machine while the shaft F is lifted positively it descends by its own weight to the point permitted by cam H, thus allowing it to regulate its descent by the trimming action of the cutter $m$ upon the shell. This arrangement is preferable to a positive action of the cam upon shaft F in carrying it downward, because it prevents undue strain upon the cutter $m$ from varying density of the metal being cut.

What I claim as new and of my invention is—

1. In combination with the reciprocating trimming-cutter $m$, the reciprocating shell carrier and holder $d$, moving in a path substantially at right angles to that of the former, as and for the purpose set forth.

2. In combination with the reciprocating trimming-cutter $m$, the shell-holder composed of parts $d$ and $d^2$, formed to receive and hold the shell between them, substantially as described.

3. In combination with the shell-holder $d\ d^2$, the feeding-tube E and the trimming-cutter $m$, substantially as described.

4. In combination with the shell-holder $d\ d^2$ and the trimming-cutter $m$, the shell-discharge aperture $d^8$, substantially as described.

5. The combination of the shell-holder $d^2$, the ejector $e$, and the aperture $d^8$ with the trimming-cutter $m$, substantially as described.

6. In combination with the reciprocating trimming-cutter $m$, the shell carrier and holder $d$, the disk $c$, pin $c'$, and slot $c^2$ in plate $c^3$, and suitable connecting driving mechanism between said plate and shell carrier and holder, said pin and slot being so arranged and adjusted that slide $d$ is stationary during the trimming action of the cutter, substantially as described.

7. The combination of the reciprocating trimming-cutter $m$ and the reciprocating shell-carrier $d$, respectively, with a single driving-shaft, B, by suitable connecting mechanism operating them, substantially as and for the purpose described.

8. In combination with the shell-holder $d\ d^2$, the reciprocating shell-trimming cutter $m$, adapted to advance upon the shell during its operation in trimming automatically and with a pressure adapted to the rate of trimming until it reaches a predetermined point, and then receding positively therefrom, substantially as described.

9. The combination, with shaft F, of sleeve $e^2$, rod $e^3$, cam H, and driving-shaft B, substantially as described.

10. In combination with cam H, reciprocating shaft F by suitable intervening mechanism, the projection on the rear face of said cam, lever $e^7$, and shell-ejector $e$, substantially as described.

11. In combination with the reciprocating shell-carrier $d$ and abutment $d^2$, the curved arm $d^5$, substantially as described.

12. The combination of sliding shell-carrier $d$, slide $c^7$, post $c^6$, rod $c^4$, plate $c^3$, provided with slot $c^2$, pin $c'$, and plate $c$, substantially as described.

13. In combination with a machine for trimming cartridge-shells, a shell-feeding tube, E, substantially as described.

14. In combination with the reciprocating shaft F, the fixed collars $e'\ e'$, the sleeve $e^2$, rod $e^3$, the sliding guide $e^4$, and the cam H, substantially as described.

PAUL BUTLER.

Witnesses:
DAVID HALL RICE,
N. P. OCKINGTON.